United States Patent [19]

Seabaugh et al.

[11] Patent Number: 5,680,280
[45] Date of Patent: Oct. 21, 1997

[54] MAGNETIC FIELD SENSOR USING HETEROJUNCTION BIPOLAR TRANSISTORS

[75] Inventors: Alan Carter Seabaugh, Richardson; Gary A. Frazier, Garland, both of Tex.

[73] Assignee: Texas Instruments Incorporated, Dallas, Tex.

[21] Appl. No.: 711,010

[22] Filed: Sep. 11, 1996

Related U.S. Application Data

[60] Provisional application No. 60/602,678 Sep. 11, 1995.
[51] Int. Cl.$^6$ ................................................. G11B 5/33
[52] U.S. Cl. ............................................................ 360/110
[58] Field of Search .................................. 360/110, 113, 360/114, 122

[56] References Cited

U.S. PATENT DOCUMENTS

| | | | |
|---|---|---|---|
| 4,485,419 | 11/1984 | Vinal | 360/122 |
| 4,499,515 | 2/1985 | Piotrwski et al. | 360/113 |
| 4,878,140 | 10/1989 | Gill et al. | 360/113 |
| 4,912,451 | 3/1990 | Sugiyama et al. | 338/32 R |
| 5,065,204 | 11/1991 | Tomisawa et al. | 357/27 |
| 5,103,353 | 4/1992 | Jove et al. | 360/113 X |
| 5,184,106 | 2/1993 | Partin et al. | 338/32 R |
| 5,189,367 | 2/1993 | Lee et al. | 324/252 |
| 5,191,223 | 3/1993 | Munekata | 257/421 |
| 5,309,305 | 5/1994 | Nepela et al. | 360/113 |
| 5,436,448 | 7/1995 | Hosaka et al. | 250/306 |
| 5,546,030 | 8/1996 | Cameron | 327/110 |
| 5,565,695 | 10/1996 | Johnson | 360/113 |

OTHER PUBLICATIONS

Ching Tsang et al., "Gigabit–Density Magnetic Recording," *Proceedings of the IEEE*, vol. 81, No. 9, Sep. 1993.
Alan C. Seabaugh et al., "Resonant–Tunneling Transistors," *Heterostructures and Quantum Devices*, Chap. 11, pp.351–383.

*Primary Examiner*—John H. Wolff
*Attorney, Agent, or Firm*—Christopher L. Maginniss; W. James Brady III; Richard L. Donaldson

[57] ABSTRACT

A magnetic sensor using heterojunction transistors for detecting magnetically recorded data. The sensor has a pair of heterojunction transistors T1, T2 connected in a differential circuit disposed on a substrate 18. The substrate 18 is carded on the free end of a suspension arm 12 at a distance D from the surface of a disk 14 having magnetically recorded data thereon. The transistors are disposed a distance S apart which is selected with D so that the magnetic field direction at one transistor is generally perpendicular to the disk 14 and the magnetic field direction at the other transistor is generally parallel to the disk 14 when a magnetic transition occurs immediately adjacent the magnetic sensor.

8 Claims, 2 Drawing Sheets

MAGNETIC FIELD SENSOR USING HETEROJUNCTION BIPOLAR TRANSISTORS

This application claims priority under 35 USC § 119(e)(1) of provisional application Ser. No. 60/602,678 filed Sep. 11, 1995.

FIELD OF THE INVENTION

This invention relates generally to the field of magnetic field sensors and particularly to a magnetic field sensor which utilizes heterojunction transistors in a configuration useful for reading magnetically recorded data on a moving magnetic recording medium.

BACKGROUND OF THE INVENTION

Magnetic recording systems in the form of direct access storage disks (DASD) and tape drives have long served as the main data storage and retrieval devices for computer and data processing systems. In principal, data is recorded in magnetization patterns on a moving magnetic media. This is accomplished by moving a recording or write head relative to the magnetic recording media while energizing the write head with appropriate waveforms to create the desired magnetization pattern in the magnetic recording media. Generally, the write head is an electromagnet.

Reading data previously recorded on a magnetic media is accomplished by moving the read head relative to a magnetic media. The read head intercepts the magnetic flux from the stored magnetization patterns on the moving magnetic media. The read head converts the changing magnetic flux intercepted thereby into electrical signals which are detected and decoded. In the past, the read head sensor has also been an electromagnet although other sensors have been developed including magnetoresistive sensors. In these sensors, the interception of magnetic flux leads to a change in the sensor resistance which can readily be converted into a voltage varying signal.

The fabrication of such thin film magnetoresistive read heads typically involves extensive thin-film and photolithographic processing. In addition, the thin film sensor must be disposed on a ceramic substrate such as $Al_2O_3$—TiC. The selected substrate material must have appropriate mechanical properties so that it may be shaped as part of an aerodynamic slider for flying over the magnetic media. Once the substrate has been shaped, the thin film magnetoresistive sensor is formed on the substrate. Thereafter, the contact leads are formed for connecting the sensor on the slider to sensing electronics located elsewhere in the disk drive device.

Read head performance for magnetoresistive (MR) devices have been carefully evaluated and found to be acceptable, however, certain aspects of the design ultimately limit the performance. In particular, there are three sources of noise which contribute to limiting the usefulness of MR read heads. One such source of noise is referred to as "overwrite" noise caused by imperfect erasure of old unwanted data when the new data are written over old data. A second source of noise is disk noise from non-uniformities and imperfections in the disk recording material. The third source of noise is head and electronic noise, the former due to electrical resistance of the read head and the latter due to the noise of the electronic channel. The "overwrite" noise can largely be overcome using powerful write heads. Disk noise, on the other hand, is an important source of noise and has been addressed by various known approaches for reducing the magnitude of exchange coupling between neighboring magnetic grains in the magnetic recording media. Head and electronics noise, however, has been found to be non-negligible and has been addressed by having high output MR heads. This type of noise will become even more important as data transfer rates increase to the range of 10Mb/s and higher, an environment where obtaining higher read head output seems unlikely.

SUMMARY OF THE INVENTION

In view of the problems associated with prior art magnetic sensors, it is the principal objective of this invention to provide a magnetic sensor which can quickly respond to very small magnetic field changes.

It is a further objective of the present invention to provide a magnetic sensor which functions at very high speeds and does not produce either head or electronics noise.

In achieving these and other objectives of the invention, a typical suspension arm is provided for positioning a magnetic sensor over a rotating disc on which magnetically encoded data is located. At the end of the suspension arm is a slider which is aerodynamically shaped to "fly" close to the surface of the disk as the disk is rotated at a high rate of speed. The sensor is mounted on the suspension arm in a position which is immediately adjacent to the magnetically encoded data on the disk surface. The sensor includes two heterojunction transistors disposed a distance S apart where S is the distance of the sensor separation gap required to locate the transistors so that when a magnetic transition occurs, one transistor will be disposed in a magnetic field which is substantially normal to the disk surface and the other transistor is disposed in a field substantially parallel to the disk surface. The two heterojunction transistors are electrically coupled in a differential detector circuit which produces an output signal that is representative of the difference between the field strength in the direction normal to the disk at the location of the two heterojunction transistors.

BRIEF DESCRIPTION OF THE DRAWINGS

The above mentioned and other objects, advantages and features of the present invention are discussed below in greater detail in connection with the drawings wherein.

DETAILED DESCRIPTION

Figure 1:
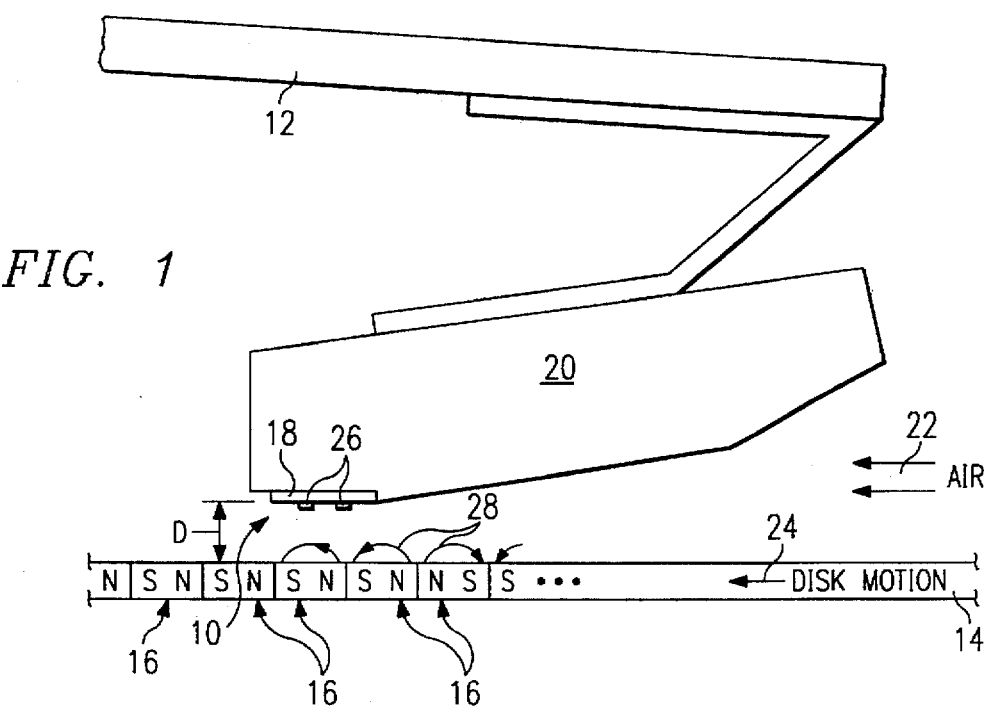
FIG. 1 illustrates a magnetic sensor disposed at one end of a suspension arm.

FIG. 1 is a vertical illustration showing schematically the magnetic sensor 10 of the present invention disposed on the free end of a suspension arm 12. The sensor 10 is disposed above a rotating disk 14 on which data has been magnetically recorded as illustrated by the regions illustrated generally at 16. The sensor 10 includes a substrate 18 disposed on an aerodynamically shaped head 20 which "flies" in the moving air illustrated at 22 above the disk 14 as it is rotated in the direction of motion illustrated by arrow 24. As a result, the substrate 18 with its two heterojunction transistors thereon illustrated at 26 is positioned above the upper surface of disk 14 by a distance D which typically is on the order of about ¼ micron. By being disposed so close to the upper surface of the disk 14, the transistors 26 can easily pass through the field lines, some of which are illustrated at 28, for the magnetically recorded regions 16 as the disk 14 is rotated.

The suspension arm 12 is movable in such a way that the head 20 can be positioned over each of a plurality of concentric circular tracks containing magnetically recorded data on the upper surface of the disk 14. Each track has a plurality of magnetically recorded regions 16 disposed therealong. As such, the transistors 26 pass through the magnetic field lines of a plurality of recorded regions during each revolution of the disk 14. In addition, the transistors 26 can be positioned over a plurality of tracks of magnetically recorded data, the regions 16 of FIG. 1 being illustrative of but one of the plurality of circular tracks on the disk 14.

Figure 2A:
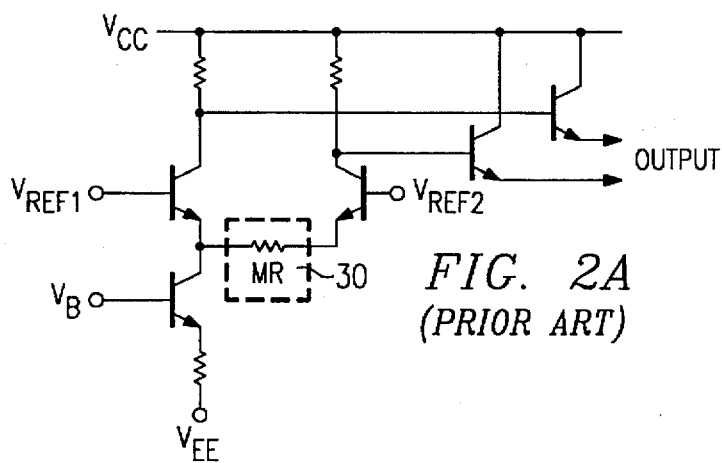
FIG. 2a illustrates a prior art differential circuit for detecting magnetic fields with a magnetoresistive thin film device.

FIG. 2A illustrates a prior art differential circuit for utilizing a magnetoresistive element 30 to sense the magnetically recorded data on the surface of a rotating disk. Magnetoresistive elements have been discussed with respect to sensing magnetically recorded data in the article "Gigabit-Density Magnetic Recording", Proceedings of the IEEE, Vol. 81, No. 9, pp 1344–1359, September 1993. The magnetoresistive element 30 of the prior art is disposed on the free end of a suspension arm thereby allowing it to be moved to a position over a circular track on a disk which has magnetically recorded data thereon. The magnetoresistive element 30 is then connected by wires therefrom to the circuit of FIG. 2a. By reason of the relatively long electrical wires, noise is produced on these wires which acts to reduce the sensitivity of the configuration of FIG. 2a.

Figure 2B:
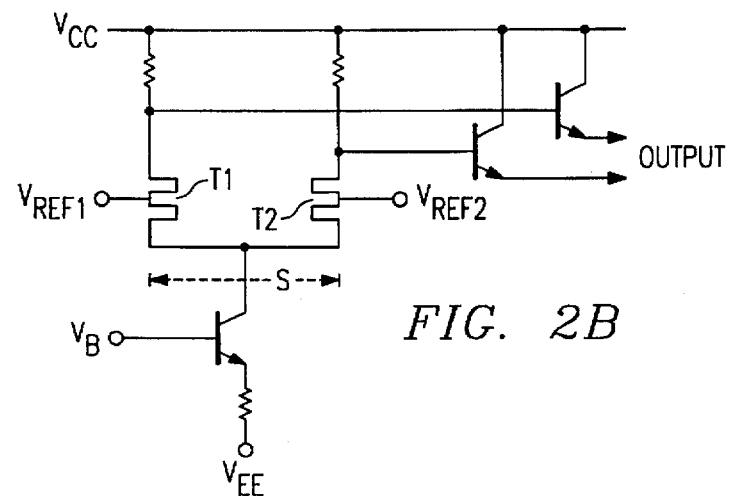
FIG. 2b illustrates a differential circuit of the present invention having two heterojunction transistors for detecting magnetic fields.

The present invention utilizes a differential circuit of the type illustrated in FIG. 2b. All of the circuitry of FIG. 2b is disposed on a substrate which itself is disposed on the free end of a suspension arm of the type illustrated in FIG. 1. This being the case, there is no need for long electrical leads connecting magnetic sensor on the free end of the suspension arm with the electronics located remotely with respect to the free end of the suspension arm. As such, one of the major sources of electrical noise in prior art magnetic sensors is eliminated by the present configuration.

In FIG. 2b, the following parameters are typical:

$V_{CC}$=about +3 to +5 volts
$V_{EE}$=about −3 volts
$V_{REF1}$=about +1 volts
$V_{REF2}$=about +1 volts
$V_B$=about −2 volts In this configuration, the heterojunction transistors T1 and T2 are separated by a sensor separation gap having a distance S as defined above. With the voltages as listed above, an oscillating voltage will develop at the output having an amplitude which is a function of the magnitude of the difference in the magnetic field in the current transport direction at transistor T1 and the magnetic field in the current transport direction at transistor T2.

Figure 3:
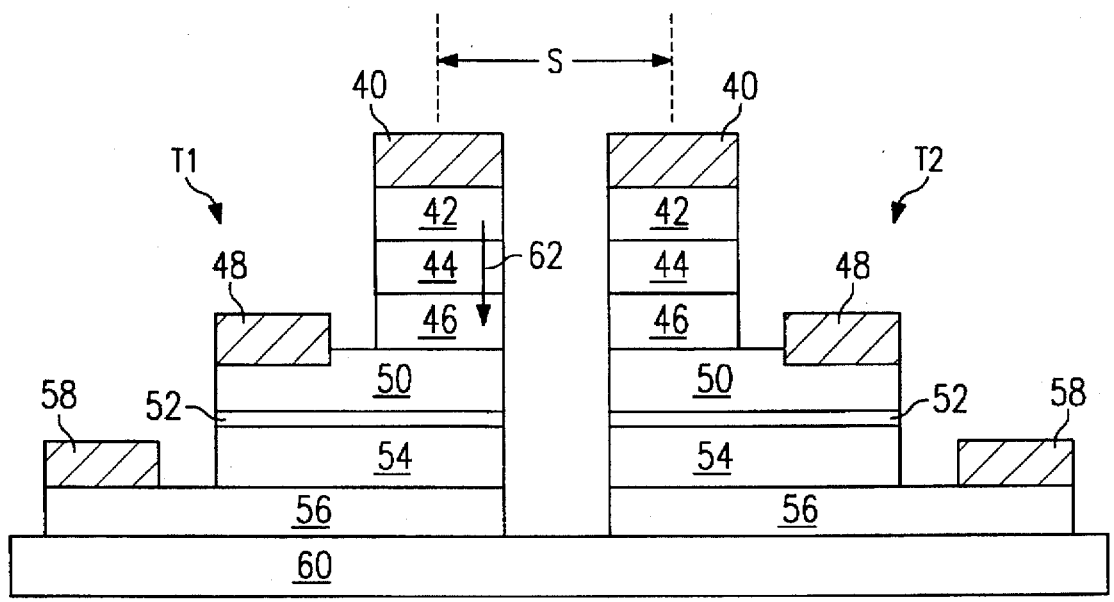
FIG. 3 illustrates the relative positioning of the two BiQuaRTTs with respect to magnetically recorded data on a substrate such as a disk.

Referring now to FIG. 3, the physical structure of the transistors T1 and T2 is illustrated. Due to a requirement to be able to physically position transistor T1 and T2 very close to each other, the structure of these transistors is somewhat different from each other so as to permit the metal emitter contact 40 thereof to be located a distance S apart where S is the distance of the sensor separation gap defined earlier. Each emitter includes an InGaAs emitter contact layer 42 disposed above an InAlAs layer 44 on top of an InGaAlAs layer 46. The base includes a metal contact 48 for providing an electrical contact to the p+ InGaAs base layer 50. The base layer 50 rests on a thin AlAs tunnel barrier layer 52. Below that is an InGaAs collector 54 that rests on a n+ InGaAs subcollector 56 which is in contact with the metal collector contact 58. The entire above described structure of both transistors T1 and T2 rest on top of a Fe - doped InP substrate 60.

As noted in the text "Heterostructures and Quantum Devices", Academic Press (1994) at page 376, when a magnetic field is applied in the current transport direction, an increase of current at resonance is observed in heterojunction transistors. For the structure of FIG. 3, the current transport direction is indicated generally by the arrow 62 for transistor T1. Due to symmetry, the current transport direction for transistor T2 is parallel to arrow 62 and passing through the emitter thereof.

As will be understood by those of skill in the art, the structure of FIG. 3 must be physically designed to meet the intended application. In particular, attention must be paid to the distance between the metal emitter contact 40 and the surface of the disk on which magnetically recorded data is to be read. The transistors T1 and T2 must be located a distance D from the surface of the disk which permits them to be spaced a distance S apart whereat the field direction in the vicinity of a magnetic transition on the disk results in magnetic field through one of the transistors to be mainly in the direction of arrow 62 and the field through the other transistor to be mainly in a direction perpendicular to the arrow 62. When this condition exists, the output of the circuit in FIG. 2b will be a maximum thereby resulting in maximum signal production when a magnetic transition is detected.

Figure 4:
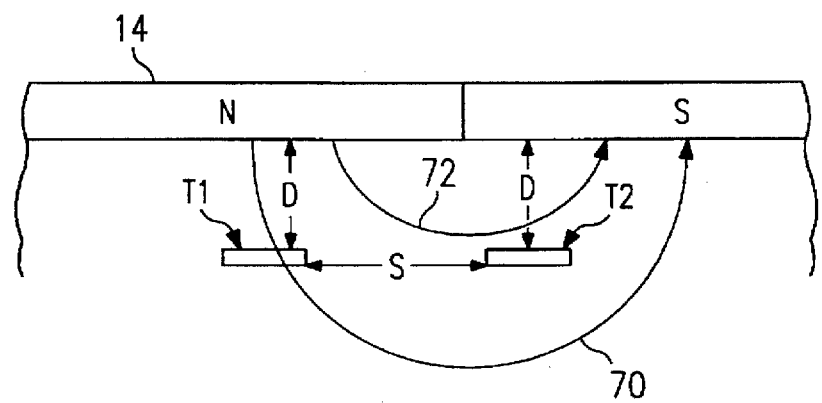
FIG. 4 illustrates the orientation of the magnetic fields near the magnetic sensor when it is disposed near a magnetic transition on a disk with magnetically recorded data thereon.

FIG. 4 illustrates the above described relationships in manner which is not drawn to scale. A magnetic transition occurs when one magnetically recorded bit has its north pole disposed adjacent the south pole of an adjacently recorded bit. When this occurs, some of the magnetic field lines between these poles will take the form of field line 70. Thus, the field direction of the magnetic field at transistor T1 is generally in a direction perpendicular to the plane of the disk if the distance D is selected properly. In a similar fashion, if D and S are selected properly, the direction of other magnetic field lines in the region of transistor T2 will be generally parallel to the disk 14 as illustrated by field line 72. When this relationship of the magnetic fields at transistors T1 and T2 occurs, the maximum difference between currents through the transistors T1 and T2 occurs. As such, the voltage at the output of the circuit of FIG. 2b will be a maximum.

Those of skill in the art will recognize that various modifications may be made to the above described invention without departing from the spirit and scope of the present invention. For example, the transistor structure of FIG. 3 can be modified to produce other heterojunction transistors having the same characteristic of responding to magnetic fields in the current transport direction. One such modification is to produce a transistor of the type shown in FIG. 3 but without the tunnel barrier layer 52. Additionally, any bipolar quantum well resonant tunneling transistor can be utilized. These and other modifications to the described invention can be made without departing from the spirit and scope of the present invention as defined by the following claims.

What is claimed is:

1. A magnetic field sensor for detecting magnetically recorded data on the surface of a substrate comprising, in combination:

a first and second heterojunction bipolar transistor;

means to move said transistors relative to the magnetically recorded data so that the magnetic field at the transistors varies over time; and circuit means coupled to both said transistors to produce a signal representative of the magnetic field variations that occur at said transistors.

2. The magnetic field sensor of claim 1 wherein said first and second transistors are located a distance S apart where S is length of the sensor separation gap required to permit one transistor to be located where the field direction in the region of a magnetic transition on the disk is generally normal to the surface of the disk and the field direction at the other transistor is generally in a direction parallel to the surface of the disk.

3. The magnetic field sensor of claim 2 wherein said circuit means comprises a differential circuit whose output is representative of the difference of the voltage across said two transistors.

4. The magnetic field sensor of claim 3 wherein said transistors are disposed with the current transport direction thereof being generally normal to the surface of the disk.

5. The magnetic field sensor of claim 2 wherein said transistors are disposed with the current transport direction thereof being generally normal to the surface of the disk.

6. The magnetic field sensor of claim 1 wherein said circuit means comprises a differential circuit whose output is representative of the difference of the voltage across said two transistors.

7. The magnetic field sensor of claim 6 wherein said transistors are disposed with the current transport direction thereof being generally normal to the surface of the disk.

8. The magnetic field sensor of claim 1 wherein said transistors are disposed with the current transport direction thereof being generally normal to the surface of the disk.

* * * * *